UNITED STATES PATENT OFFICE.

EMIL KNOEVENAGEL, OF HEIDELBERG, AND HANS LEBACH, OF LUDWIGSHAFEN, GERMANY, ASSIGNORS TO THE FIRM OF KNOLL AND COMPANY, OF LUDWIGSHAFEN-ON-THE-RHINE, GERMANY, A CORPORATION OF GERMANY.

CELLULOSE DERIVATIVE.

No. 891,218.     Specification of Letters Patent.     Patented June 16, 1908.

Application filed March 2, 1907. Serial No. 360,247. (Specimens.)

*To all whom it may concern:*

Be it known that we, EMIL KNOEVENAGEL, professor of chemistry, a subject of the German Emperor, residing at Heidelberg, in the Grand Duchy of Baden, Germany, and HANS LEBACH, chemist, a subject of the German Emperor, residing at Ludwigshafen, in the Grand Duchy of Bavaria, Germany, have invented certain new and useful Improvements Relating to Cellulose Derivatives, of which the following is a specification.

It is well known that cellulose is capable of yielding acid derivatives, of which in particular the nitric acid and acetic acid derivatives have acquired technical importance. We have found, that derivatives of cellulose with organic acids may be formed, if cellulose or its closely allied conversion products, such as hydro-cellulose, oxy-cellulose, etc. be brought together and heated with the anhydrids of organic acids in the presence of volatile mono-basic mineral acids By means of these volatile mono-basic acids. the formation of acidyl cellulose takes place, as it does by means of sulfuric acid in cases which have previously become known (see Franchimont, *Ber. d. Deutsch. Chem. Ges.* 14 page 1290 and *Rec. Trav. Chim. Pays. Bas.* 18 page 472 Skraup, *Ber. d. Deutsch Chem. Ges.* 32 page 2413, Lederer, specifications of German Patents 118538 and 120713, Farbenfabriken vorm. Bayer & Co., specification of German Patent 153350) or by means of phenol-sulfonic acids (French Patent specification 324862). In comparison with these acidylizing agents the agents employed by us in the preparation of acid derivatives of cellulose in the manner hereinafter described offer important advantages, which consist in the fact, that the solutions prepared by their aid may be kept for months without suffering any loss of viscosity and can be also solidified by evaporation of the solvent at not too high a temperature without decomposition. Solutions prepared by means of these substances are therefore adapted to be spun into artificial silk, either directly in the air or in suitable precipitating agents, and may be employed directly for the preparation of films and celluloid compositions, whereas in the known process the acid esters of cellulose had to be first precipitated and freed by washing from the adhering acids, before solutions which could be spun, films or celluloid compositions could be prepared from them.

With the use of volatile mono-basic acids, such for example, as hydrochloric acid, nitric acid or mixtures thereof, this advantage is to be ascribed to the volatility of the acid employed, which does not enter into chemical combination in the acidylizing process, and also to their mono-basicity, which causes any quantities of the acids which may combine with the cellulose to completely lose their acid properties at the same time, which is not the case with polybasic acids.

When volatile mono-basic acids are employed for the preparation of viscous soluble acidyl-cellulose according to the present invention these acids are employed in quantities which in general correspond to 0.1 to 0.3 parts by weight of the cellulose employed, and the acidylation is carried out at temperatures between 40° and 80° C. If attempts be made to acidylize with substantially smaller quantities than 0.1 parts of the acid to 1 part of cellulose (similar to the examples in the specification of French Patent No. 319648, *e. g.* with hydrochloric acid in place of sulfuric acid) no acidylization at all takes place at ordinary temperatures, even after a comparatively long time. If, under otherwise equal conditions, viz: while using less than 0.1 part of the acid to 1 part of cellulose, the reaction temperature be raised to 70° C. for example, only incomplete acidylation takes place, even after a somewhat protracted period of time. The use of hydrochloric acid in acetylization has also become known in another form by a research of Zd. H. Skraup and his collaborators (*Wiener Monatshefte f. Chemie* XXVI 1905. 1450). Whereas, however, the above investigators obtained at ordinary temperature by the action of acetic anhydrid saturated with hydrochloric acid gas, chloracetyl derivatives of cellulose and on prolongated action even secondary products thereof, we on the contrary, obtain pure acidyl derivatives, owing to the use of substantially smaller quantities of acid.

The following examples may serve to explain the process:

Example I: Into a mixture of 5 parts of acetic anhydrid and 4 parts of glacial acetic acid are led 0.1 to 0.2 parts of hydrochloric acid gas, and after this 1 part of cellulose, e. g. wadding, is added. Solution as acetylcellulose takes place at about 70° C. within 30 to 40 hours.

Example II: To 5 parts of propionic anhydrid and 4 to 5 parts of glacial acetic acid is added as much concentrated aqueous hydrochloric acid, as corresponds to 0.1 parts of hydrogen chlorid. After the addition of 1 part of cellulose, solution as propionyl-cellulose takes place at about 70° C. in 12 to 24 hours.

Example III: To 5 parts of acetic anhydrid and 4 to 5 parts of acetic acid (while being cooled) are added from 0.1 to 0.2 parts of an approximately 65 per cent. nitric acid and 1 part of cellulose, and the whole brought into a bath of about 70° C. After 1 to 3 days about 0.1 parts of the same acid are again added. The formation of a completely colorless very viscous solution as acetyl cellulose takes place in 4 to 6 days.

Example IV: To a cold mixture of 5 parts of acetic anhydrid and 4 to 5 parts of acetic acid are added 0.1 to 0.2 parts of a cold mixture of say 3 parts of concentrated hydrochloric and 1 part of concentrated nitric acid, and 1 part of cellulose. At about 70° C. a clear viscous solution is obtained in 5 to 15 hours.

The chemical reactions taking place in Examples I, III and IV may be represented by the following equation:

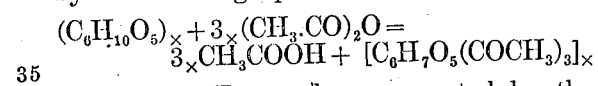

Example II may be represented by the following equation:

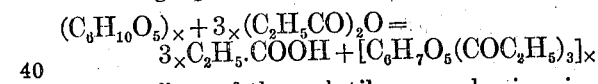

The effect of the volatile mono-basic mineral acids at a high temperature cannot well be illustrated by chemical equation. The chemical reaction, as far as it is capable of illustration by chemical equation, is well-known, but under the influence of mono-basic mineral acids and heat the acid derivatives of cellulose resulting from our process acquire valuable properties, which they do not possess under the conditions hitherto known.

What we claim is:—

1. The process for the manufacture of cellulose ester solutions from cellulose by the action of organic acid anhydrids in the presence of volatile mono-basic mineral acids, which consists in adding to an organic acid anhydrid in solution a volatile mono-basic mineral acid corresponding in weight to from 0.1 to 0.3 parts of the cellulose employed, and causing the resulting acid mixture to act on the cellulose at a temperature ranging between 40° C. to 80° C., substantially as described.

2. The process for the manufacture of acetyl-cellulose solutions from cellulose by the action of acetic anhydrid in the presence of hydrochloric acid, which consists in adding to the acetic anhydrid in solution hydrochloric acid corresponding in weight to from 0.1 to 0.3 parts of the cellulose employed, and causing the resulting acid mixture to act on the cellulose at a temperature ranging between 40° C. and 70° C., substantially as described.

In testimony whereof we have hereunto set our hands in the presence of two subscribing witnesses.

EMIL KNOEVENAGEL.
HANS LEBACH.

Witnesses:
H. W. Harris,
Jos. H. Leute.